United States Patent [19]

Matsui et al.

[11] Patent Number: 5,107,363
[45] Date of Patent: Apr. 21, 1992

[54] PROJECTION-TYPE DISPLAY APPARATUS

[75] Inventors: Fumio Matsui; Yasushi Murata; Satoru Tanaka, all of Saitama, Japan

[73] Assignee: Pioneer Electronic Corporation, Tokyo, Japan

[21] Appl. No.: 498,053

[22] Filed: Mar. 23, 1990

[30] Foreign Application Priority Data

Jul. 5, 1989 [JP] Japan .................................. 1-173809

[51] Int. Cl.$^5$ ......................... G02B 26/08; G02B 5/04; H04N 9/14; H04N 3/08
[52] U.S. Cl. .................................... 359/211; 359/831; 358/63; 358/206
[58] Field of Search ............................... 350/6.1–6.91, 350/358, 286, 287; 250/201.5, 202; 356/400; 358/199–208, 231, 60, 63

[56] References Cited

U.S. PATENT DOCUMENTS

| | | | |
|---|---|---|---|
| 3,614,312 | 10/1971 | Fournier et al. | 358/208 |
| 4,150,880 | 4/1979 | Howe et al. | 350/358 |
| 4,455,485 | 6/1984 | Hosaka et al. | 350/358 |
| 4,566,760 | 1/1986 | Abramovitz et al. | 350/358 |
| 4,597,630 | 7/1986 | Brandstetter et al. | 350/3.83 |
| 4,730,295 | 3/1988 | Bressers | 250/202 |
| 4,770,507 | 9/1988 | Arimoto et al. | 350/286 |
| 4,828,371 | 5/1989 | McCaslin et al. | 350/286 |
| 4,888,752 | 12/1989 | Arai | 250/201.5 |

Primary Examiner—Bruce Y. Arnold
Assistant Examiner—Thong Nguyen
Attorney, Agent, or Firm—Sughrue, Mion, Zinn, Macpeak & Seas

[57] ABSTRACT

A projection-type display apparatus has a light modulator for emitting a zero-order diffracted beam and a first-order diffracted beam which are added by a prism into a projecting light beam which is introduced into a light beam scanning system, which two-dimensionally scans a screen. The maximum intensity of the projecting light beam is increased to increase the brightness of the overall screen.

2 Claims, 2 Drawing Sheets

PROJECTION-TYPE DISPLAY APPARATUS

BACKGROUND OF THE INVENTION

1. Field of the Invention

The present invention relates to a projection-type display apparatus.

2. Description of the Related Art

In one conventional projection-type display apparatus, a laser beam emitted from a laser beam source is modulated in intensity with a modulating signal by a light modulator, and a first-order diffracted beam from the light modulator is introduced as a projecting beam into a light beam scanning system which applies the projecting beam to scan a screen two-dimensionally for thereby projecting an image on the screen.

Since the first-order diffracted beam produced by the light modulator has a higher extinction ratio than a zero-order diffracted beam which is also emitted from the light modulator, the zero-order diffracted beam is cut off by a prism or a pinhole, and only the first-order diffracted beam is employed as a projecting beam. However, the brightness of the overall screen is limited because the maximum intensity of the first-order diffracted beam is determined by the modulation efficiency and the beam intensity can be modulated only within the modulation range of the first-order diffracted beam.

The extinction ratio referred to above is the ratio Imin/Imax (or its reciprocal) of a minimum value Imin to a maximum value Imax which can be assumed by the intensity of an output light beam which is modulated.

SUMMARY OF THE INVENTION

It is an object of the present invention to provide a projection-type display apparatus which has a relatively simple arrangement for increasing the brightness of an overall screen.

According to the present invention, a projection-type display apparatus comprises a light modulating means for modulating the intensity of an applied light beam with a modulating signal. Zero- and first-order diffracted beams emitted from the light modulating means are added into a projecting light beam that is introduced into a light beam scanning means, which two-dimensionally scans a screen with the projecting light beam.

The modulation range of the projecting beam is increased by the extent corresponding to the added zero-order diffracted beam, so that the maximum intensity of the projecting beam can be increased.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
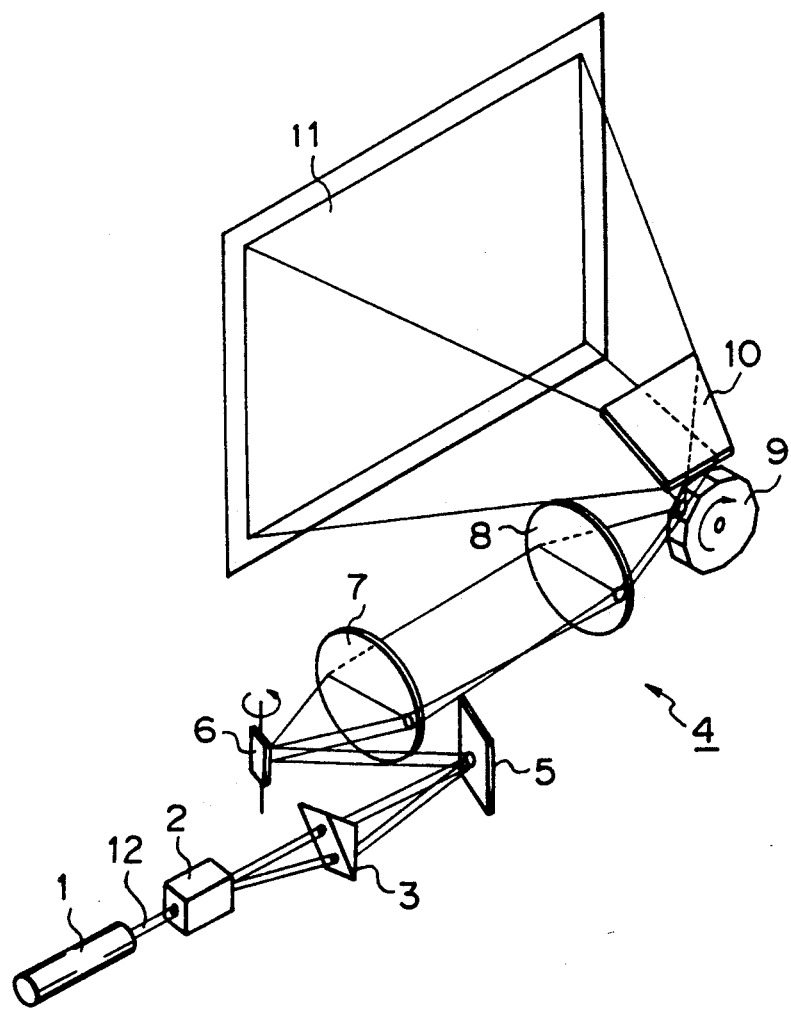
FIG. 1 is a schematic perspective view of a projection-type display apparatus according to the present invention.

FIG. 1 schematically shows a projection-type display apparatus according to the present invention.

Figure 2:
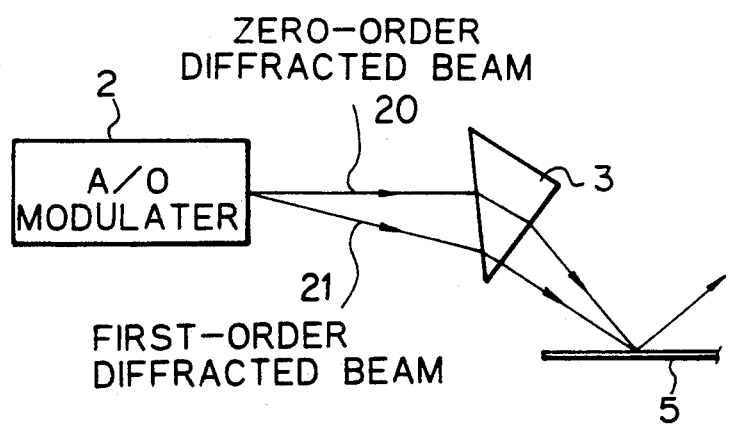
FIG. 2 is a schematic view illustrative of operation of a prism employed in the display apparatus.

A laser beam 12 emitted from a laser beam source 1 is applied to an acoustooptic (A/O) modulator 2. The A/O modulator 2 modulates the intensity of the applied laser beam 12 with a modulating signal in the form of a time-division color signal composed of three-primary signals representative of the colors of unit pixels, for example. The A/O modulator 2 divides the applied laser beam 12 into a zero-order diffracted beam and a first-order diffracted beam according to Bragg diffraction conditions. The zero-order diffracted beam and the first-order diffracted beam are then applied to a prism 3 which serves as a beam adding means for adding the zero- and first-order diffracted beams. The prism 3 is positionally adjustable in a plane including the axes of the applied beams. As shown in FIG. 2, the prism 3 is positionally adjusted such that it adds the zero- and first-order diffracted beams, 20 and 21, respectively, emitted thereby. The zero- and first-order diffracted beams which are added by the prism 3 are then introduced as a projecting beam into a light beam scanning system 4.

In the light beam scanning system 4, the single projecting beam is reflected by a reflecting mirror 5 and applied to a galvanometer mirror 6. The galvanometer mirror 6 is angularly moved back and forth in synchronism with a vertical synchronizing signal of a composite color television signal for thereby deflecting the applied beam in a vertical scanning direction. The light beam deflected by the galvanometer mirror 6 is then applied through a pair of relay lenses 7, 8 to a rotating polygon 9. The rotating polygon 9 is rotated in synchronism with a horizontal synchronizing signal of the composite color television signal for thereby deflecting the applied light beam in a horizontal scanning direction. The light beam deflected by the rotating polygon 9 is then reflected by a reflecting mirror 10 onto a screen 11, which is scanned in the horizontal and vertical scanning directions.

In this manner, the laser beam is modulated in intensity with the time-division color signal composed of the three-primary signals of the television signal, and the screen 11 is two-dimensionally scanned with the modulated laser beam by the light beam scanning system 4. With this arrangement, the projection-type color television display apparatus has a high resolution and a high saturation. Since the zero-order diffracted beam and the first-order diffracted beam are added into the projecting beam, the modulation range of the projecting beam is rendered greater by the extent corresponding to the added zero-order diffracted beam than with the conventional display apparatus in which only the first-order diffracted beam is employed as the projecting beam. Accordingly, the maximum intensity of the projecting beam is increased, and the brightness of the overall screen is also increased.

The arrangement of the light beam scanning system 4 shown in FIG. 1 is shown by way of illustrative example only, and the light beam scanning system 4 is not limited to the illustrated structure.

With the present invention, as described above, the projection-type display apparatus comprises a light modulating means for modulating the intensity of an applied light beam with a modulating signal. Zero- and first-order diffracted beams emitted from the light modulating means are added into a projecting light beam that is introduced into a light beam scanning means, which two-dimensionally scans a screen with the projecting light beam. The modulation range of the projecting beam is increased by the extent corresponding to the added zero-order diffracted beam, so that the maximum intensity of the projecting beam can be increased.

Consequently, the projection-type display apparatus of the present invention can increase the brightness of the overall screen with a simpler arrangement than the conventional projection-type display apparatus.

Although a certain preferred embodiment has been shown and described, it should be understood that many changes and modifications may be made therein without departing from the scope of the appended claims.

We claim:

1. A projection-type display apparatus comprising:
   a screen;
   light beam application means for supplying a light beam;
   light beam scanning means for two-dimensionally scanning said screen with a projecting light beam,
   acousto-optic modulator means for modulating the intensity of said light beam with a modulating signal; and
   beam adding means for adding a zero-order diffracted beam and a first-order diffracted beam which are emitted from said light modulating means and introducing the added beams as said projecting light beam into said light beam scanning means.

2. A projection-type display apparatus according to claim 1, wherein said beam adding means comprises a positionally adjustable prism for adding said zero-order diffracted beam and said first-order diffracted beam in an adjusted position.

* * * * *